(12) United States Patent
Rebelo et al.

(10) Patent No.: US 10,339,288 B2
(45) Date of Patent: Jul. 2, 2019

(54) USER AUTHENTICATION FOR MOBILE DEVICES USING BEHAVIORAL ANALYSIS

(71) Applicant: MCAFEE, INC., Santa Clara, CA (US)

(72) Inventors: Joshua Cajetan Rebelo, Bangalore (IN); Jeyasekar Marimuthu, Portland, OR (US)

(73) Assignee: MCAFEE, LLC, Santa Clara, CA (US)

( * ) Notice: Subject to any disclaimer, the term of this patent is extended or adjusted under 35 U.S.C. 154(b) by 0 days.

(21) Appl. No.: 15/026,814

(22) PCT Filed: Dec. 12, 2013

(86) PCT No.: PCT/US2013/074718
§ 371 (c)(1),
(2) Date: Apr. 1, 2016

(87) PCT Pub. No.: WO2015/088537
PCT Pub. Date: Jun. 18, 2015

(65) Prior Publication Data
US 2016/0224777 A1    Aug. 4, 2016

(51) Int. Cl.
*G06F 21/31*    (2013.01)
*G06F 21/32*    (2013.01)
*G06F 21/88*    (2013.01)
*G06F 21/62*    (2013.01)

(52) U.S. Cl.
CPC ............ *G06F 21/32* (2013.01); *G06F 21/316* (2013.01); *G06F 21/6218* (2013.01); *G06F 21/88* (2013.01)

(58) Field of Classification Search
USPC ........................................................ 726/19
See application file for complete search history.

(56) References Cited

U.S. PATENT DOCUMENTS

| | | | | |
|---|---|---|---|---|
| 5,369,706 A | * | 11/1994 | Latka | G07C 9/00182 340/11.1 |
| 7,539,724 B1 | * | 5/2009 | Callaghan | G05B 19/4185 709/205 |
| 9,275,065 B1 | * | 3/2016 | Ganesh | G06F 21/604 |
| 9,286,482 B1 | * | 3/2016 | Dumont | G06F 21/32 |
| 9,288,669 B2 | * | 3/2016 | Burch | H04W 12/06 |
| 2002/0081005 A1 | * | 6/2002 | Black | G06F 3/03545 382/124 |
| 2003/0005326 A1 | * | 1/2003 | Flemming | G06F 21/31 726/4 |

(Continued)

FOREIGN PATENT DOCUMENTS

EP    2541452 A1    6/2011

OTHER PUBLICATIONS

Extended European Search Report, dated Jun. 9, 2017.

(Continued)

*Primary Examiner* — Taghi T Arani
*Assistant Examiner* — Badri Narayanan Champakesan
(74) *Attorney, Agent, or Firm* — Hanley, Flight & Zimmerman, LLC

(57) ABSTRACT

Usage patterns of an authentic user of a mobile device are generated from data collected representing usage by the authentic user. These usage patterns may then be compared to monitored usage of the mobile device. If usage of the mobile device exceeds a threshold based on one or more of the usage patterns, access to data on the mobile device can be prevented.

8 Claims, 12 Drawing Sheets

(56) References Cited

U.S. PATENT DOCUMENTS

| | | | |
|---|---|---|---|
| 2003/0046072 A1 | 3/2003 | Ramaswamy et al. | |
| 2004/0143749 A1* | 7/2004 | Tajalli | G06F 21/316 726/23 |
| 2005/0021960 A1* | 1/2005 | McKeeth | G06F 21/31 713/170 |
| 2006/0259433 A1* | 11/2006 | Lahtinen | H04L 63/062 705/57 |
| 2009/0049544 A1* | 2/2009 | Kashi | H04L 9/3226 726/19 |
| 2009/0199296 A1* | 8/2009 | Xie | G06F 21/316 726/23 |
| 2009/0222673 A1* | 9/2009 | Schneck | G06F 21/10 713/189 |
| 2009/0253408 A1 | 10/2009 | Fitzgerald et al. | |
| 2010/0115610 A1* | 5/2010 | Tredoux | G06F 21/316 726/19 |
| 2010/0199325 A1* | 8/2010 | Raleigh | G06F 21/53 726/3 |
| 2010/0225443 A1* | 9/2010 | Bayram | G06F 21/316 340/5.83 |
| 2010/0299757 A1* | 11/2010 | Lee | G06F 21/552 726/26 |
| 2010/0325238 A1* | 12/2010 | Khedouri | G11B 27/034 709/217 |
| 2011/0138187 A1* | 6/2011 | Kaga | G06F 21/32 713/186 |
| 2011/0159850 A1* | 6/2011 | Faith | G06Q 30/0201 455/411 |
| 2012/0036556 A1* | 2/2012 | LeBeau | G06F 3/048 726/3 |
| 2012/0174214 A1* | 7/2012 | Huang | G06F 21/32 726/19 |
| 2012/0214442 A1* | 8/2012 | Crawford | H04W 12/06 455/411 |
| 2012/0222125 A1* | 8/2012 | Kidron | G06F 15/167 726/26 |
| 2013/0036459 A1* | 2/2013 | Liberman | H04L 9/0866 726/6 |
| 2013/0078948 A1* | 3/2013 | Pecen | H04L 63/0823 455/411 |
| 2013/0111586 A1* | 5/2013 | Jackson | G06F 11/3438 726/23 |
| 2013/0207779 A1* | 8/2013 | Uno | G06F 21/32 340/5.82 |
| 2013/0314208 A1* | 11/2013 | Risheq | G07C 9/00158 340/5.53 |
| 2013/0326592 A1* | 12/2013 | Yamada | H04M 1/67 726/4 |
| 2014/0283005 A1* | 9/2014 | Avni | G06F 21/64 726/16 |
| 2014/0283007 A1* | 9/2014 | Lynch | G06F 21/316 726/17 |
| 2014/0354401 A1* | 12/2014 | Soni | G06F 21/32 340/5.52 |
| 2014/0379911 A1* | 12/2014 | Fayssal | H04L 63/107 709/225 |
| 2015/0089634 A1* | 3/2015 | DeLuca | G06F 3/0488 726/19 |
| 2016/0066189 A1* | 3/2016 | Mahaffey | G06F 21/88 455/405 |

OTHER PUBLICATIONS

European Patent Office, "Communication pursuant to Article 94(3) EPC," issued in connection with European Application No. 13899089.0, dated Nov. 23, 2018, 10 pages.

International Searching Authority, "International Search Report and Written Opinion," issued in connection with application No. PCT/US2013/074718, dated Sep. 15, 2014, 17 pages.

International Searching Authority, "International Report on Patentability," issued in connection with application No. PCT/US2013/074718, dated Jun. 14, 2016, 11 pages.

* cited by examiner

USER AUTHENTICATION FOR MOBILE DEVICES USING BEHAVIORAL ANALYSIS

TECHNICAL FIELD

This disclosure relates generally to systems, apparatuses, methods, and computer readable media for determining whether usage of the mobile computing device exceeds a threshold of one or more usage patterns. More particularly, but not by way of limitation, this disclosure relates to systems, apparatuses, methods, and computer readable media to determine whether usage of a mobile computing device exceeds a threshold of one or more usage patterns and inhibit access to data stored on the mobile computing device if usage of the mobile computing device exceeds a threshold.

BACKGROUND

People often possess and carry with them one or more of a variety of mobile electronic computing devices. These mobile computing devices are known to include cellular phones, smartphones, tablet computers (or simply tablets), and handheld media players amongst several other well-known mobile computing devices. Many of these devices are frequently used by their owners to store personal or sensitive data. For example, users of mobile devices are known to store sensitive data such as credit card numbers, passwords, social security numbers, bank information, contact lists, calendar information, and other sensitive data. Accordingly, if the mobile device is lost or stolen, the loss of the device can be exceedingly disruptive to the owner's peace of mind and security. Thus, the owner may desire to prevent access to their sensitive data if their mobile device is lost.

Some manufacturers of mobile computing devices provide a password feature, in an effort to prevent unauthorized access the mobile computing device, if the device is lost or stolen. The password is typically requested upon power up or actuating a "home," "start," or similar button of the device. However, there are a number of well-known workarounds that an unauthorized user may use to bypass or reveal the password.

There are technologies available today that allow a user to remotely locate a lost mobile device, such as a smartphone. Some of these technologies also allow a user to track their lost device, if the device is in transit. Additionally, some mobile computing devices may allow the user remotely lock the device and remove the data stored on the device.

However, a disadvantage of these available technologies is that once an unauthorized user has accessed sensitive data stored on the mobile device, such as passwords and other data, the unauthorized user appears as an authorized user to the device, since they may possess the password and other information for accessing data stored on the device and other sensitive information. As can be appreciated, an alternative mechanism to inhibit access to data stored on the mobile computing device would be desirable.

DETAILED DESCRIPTION

Disclosed are systems, apparatuses, methods, and readable media for determining whether usage of the mobile computing device exceeds a threshold of one or more usage patterns. More particularly, but not by way of limitation, this disclosure relates to systems, apparatuses, methods, and computer readable media to determine whether usage of a mobile computing device exceeds a threshold of one or more usage patterns and prevents access to data stored on the mobile computing device if usage of the mobile device exceeds a threshold.

Figure 1:
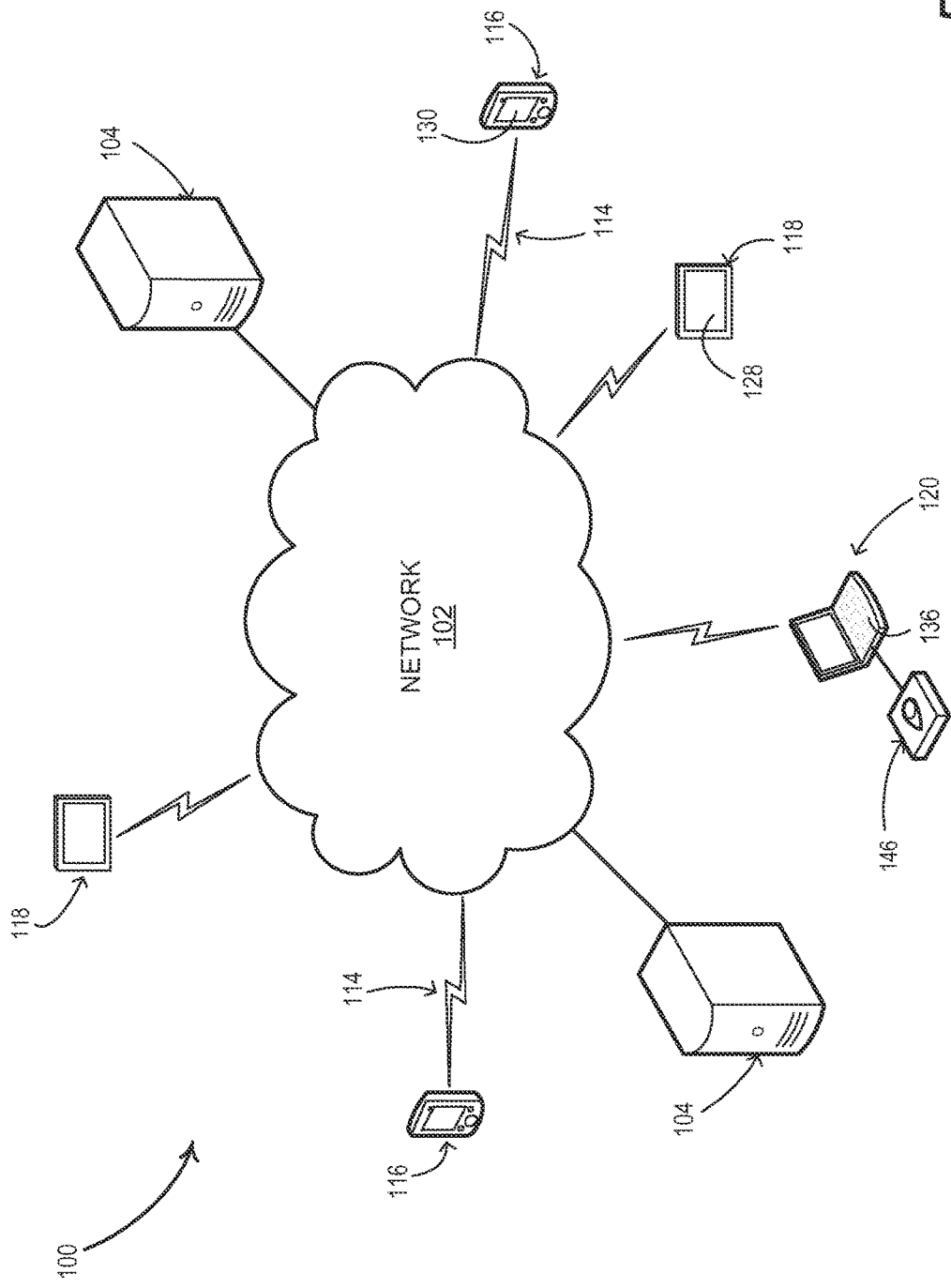
FIG. 1 is a simplified block diagram illustrating network architecture according to one or more disclosed embodiments.

An issue common to prior art mobile electronic computing devices is that once an unauthorized user has accessed sensitive data stored on the mobile device, such as passwords and other data, the unauthorized user appears as an authorized user to the device. One proposed solution to this issue is described herein and illustrated in the accompanying Figures. As illustrated in FIG. 1, there is shown generally at 100 an embodiment of a system to determine whether usage of a mobile computing device exceeds one or more thresholds of one or more usage patterns and prevents access to data stored on the mobile computing device if usage of the device exceeds the one or more thresholds. In a general embodiment, the system 100 is adapted to collect data representative of usage of a mobile computing device by an authentic user, generate one or more usage patterns from the collected data, monitor usage of the device, determine whether usage of the device exceeds a threshold of one or more usage patterns, and then prevent access to data stored on the device if usage of the device exceeds the threshold. Data stored on the device may be encrypted to prevent access to the data.

In a general embodiment, the system 100 can include one or more networks 102 that may include many different types of computer and telecommunications networks. These networks 102 can include the Internet, a corporate network, a Local Area Network (LAN), or as well as different telephone and telecommunications networks. As can be appreciated, the networks 102 provide both data and voice transmission. Each of these networks can contain wired or wireless devices and operate using any number of network protocols (e.g., TCP/IP (Transmission Control Protocol/Internet Protocol)).

Figure 2:
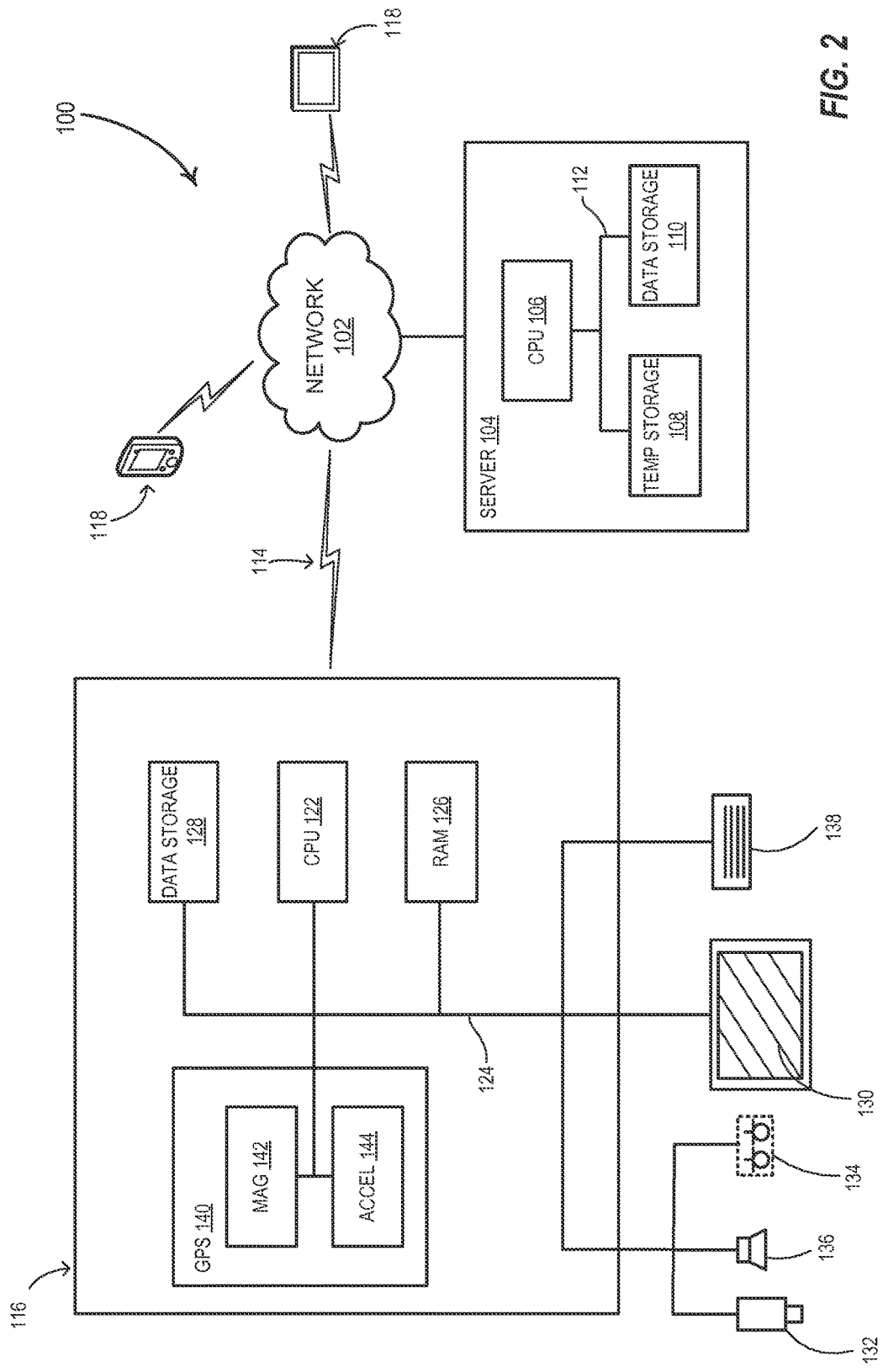
FIG. 2 simplified block diagram illustrating a mobile computing device coupled to a computing system via a network according to one or more disclosed embodiments.

As illustrated in FIG. 1 and FIG. 2, computing systems 104 may be interconnected via the network 102. The computing systems 104 are provided to respond and service requests received from the network 102. Each computing system 104 includes one or more processors 106 for processing received requests, temporary data storage 108, and data storage 110, all of which may be interconnected via a system bus 112.

A plurality of mobile computing devices, hereinafter "mobile devices," may be connected, wirelessly 114, to the network 102 to facilitate communication between mobile devices and between mobile devices and network devices, such as computing systems 104. Exemplary mobile devices may include, but are not limited to, smartphones 116, tablet computers 118, and laptop computers 120, as well as other mobile devices (not shown).

As illustrated in FIG. 2, in the embodiments, any mobile device 116, 118, 120 may include some or all of the components and associated functionalities, discussed hereinafter. The particular components discussed hereinafter are in reference to a smartphone 116, for ease of discussion only. The smartphone 116 can include a central processing unit (CPU) 122, such as a microprocessor, and a number of other components interconnected via a system bus 124. Data storage devices, such as a Random Access Memory (RAM) 126 and an optional storage unit 128, may be provided for data storage. In embodiments where the mobile device comprises a laptop computer 120 for example, the storage unit 128 may comprise disk storage.

Further, the smartphone 116 can include a touchscreen 130, camera 132, microphone 134 for recording speech, a speaker for producing sound 136, and a keyboard 138. In embodiments where the mobile device comprises a smartphone 116 or tablet 118 configured with a touchscreen 130, the keyboard 138 can comprise an on-screen keyboard, that is actuated via the touchscreen 130. Optionally, the camera 132 may be configured for capturing video, as well as still photos. The microphone 134 can capture speech from a user for voice recognition applications intended to receive and process data based on the user's commands and for recording speech, as well as other applications.

The smartphone 116 may be configured with geolocation circuitry 140. The geolocation circuitry 140 may include magnetometer circuitry 142, for measuring changes in magnetic field strength surrounding the smartphone 116, and accelerometer circuitry 144 that together generate location data. As an option, the accelerometer circuitry 144 may comprise tri-axial accelerometer circuitry 144. The geolocation circuitry 140 can generate location data that can indicate both movement and location of the smartphone 116.

The CPU 122 is capable of operating and running an operating system, such as a mobile operating system, for controlling and running the components and software applications that may be stored on the smartphone 116. In the embodiments, the mobile operating system may combine some known functionality provided by conventional personal computer operating systems with other features intended for mobile devices. This functionality can include receiving, processing, and displaying data via the touchscreen 130 and facilitating telecommunications via the network 102. The mobile operating system may provide additional functionality that can include operation of the camera 132, speech recognition for receiving and processing data via the microphone 134, a voice recorder, playback of audio data that may be stored in memory 126 or on the storage unit 128, as well as other functionality.

As an option, the CPU 122 is capable of receiving and processing biometric data. The biometric data may be generated by a biometric scanner 146 that may be coupled to a laptop 116, in some embodiments. Alternatively, the touchscreen 130 or camera 132, or both, of the smartphone 116, and other mobile devices 118, 120 may be configured receive biometric information for processing by the CPU 126, to generate biometric data.

Figure 3:
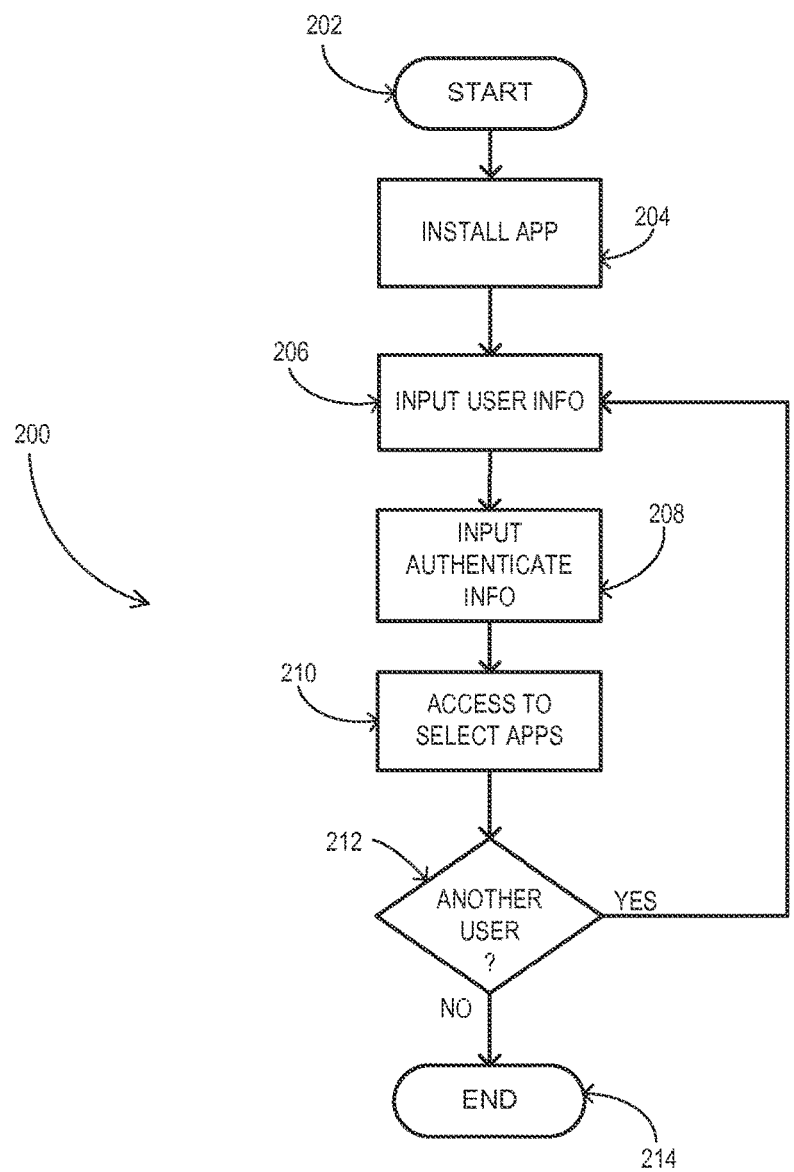
FIG. 3 illustrates a flow diagram showing an embodiment of a method for collecting data representative one or more authentic users.

Referring to FIGS. 1-3, and particularly to FIG. 3, in some embodiments, at least a portion of the system 100 may comprise one or more sets of computer instructions that may take the form of one or more software modules. The software modules may comprise one or more instances of a mobile software application, commonly referred to in the art as a "mobile application," or simply "mobile app." A mobile app is a software application designed to run on the mobile operating system of mobile devices such as smartphones 116, tablet computers 118, and other mobile devices, to provide specific features or enhanced functionalities to the mobile device.

As an option, the software modules may be carried out in the context of the architecture and environment of the Figures, and particularly FIG. 1 and FIG. 2 of the Figures. However, one or more of the software modules may be carried out in any desired environment. Additionally, the software modules can comprise instructions, which can be partially executed by the CPU 120, then transmitted to one or more computing systems 104 via the network 102, for further processing by the computing system 104. Upon receipt of the instructions, the computing system 104 can process the instructions and generate one or more responses, and transmit the response(s) to the appropriate mobile device(s) 116, 118, 120.

Referring to FIGS. 1-3, and particularly to FIG. 3, the system 100 includes an embodiment of a method for collecting data representative one or more authentic users, shown generally at 200 in FIG. 3. As an option, the method 200 may be carried out in the context of the architecture and environment of the Figures, and particularly FIG. 1 and FIG. 2. However, the method 200 may be carried out in any desired environment.

The method 200 commences in operation 202. In operation 204 a software application, such as a mobile app, is installed on a mobile device 116, 118, 120. In operation 206, a user can input their identifying information to authenticate the user to use the mobile device. As an option the user's identifying information can include their name and other information, as desired. In operation 208, the user can input authentication information, which can include a password created by the user, and other information that can authenticate the user. As an option, in operation 210, the user may only be granted access to selected mobile apps and certain data stored on the mobile device with which they are associated. This may prevent unauthorized access to various mobile apps and data stored on the mobile device.

In operation 212, it is determined if another user is to be authenticated to use the mobile device 116, 118, 120. If another user is to be authenticated to use the mobile device, the method 200 returns to operation 206, where a next user can input their identifying information. If no other users are to be authenticated to use the mobile device, the method 200 then ends in operation 214.

Figure 4:
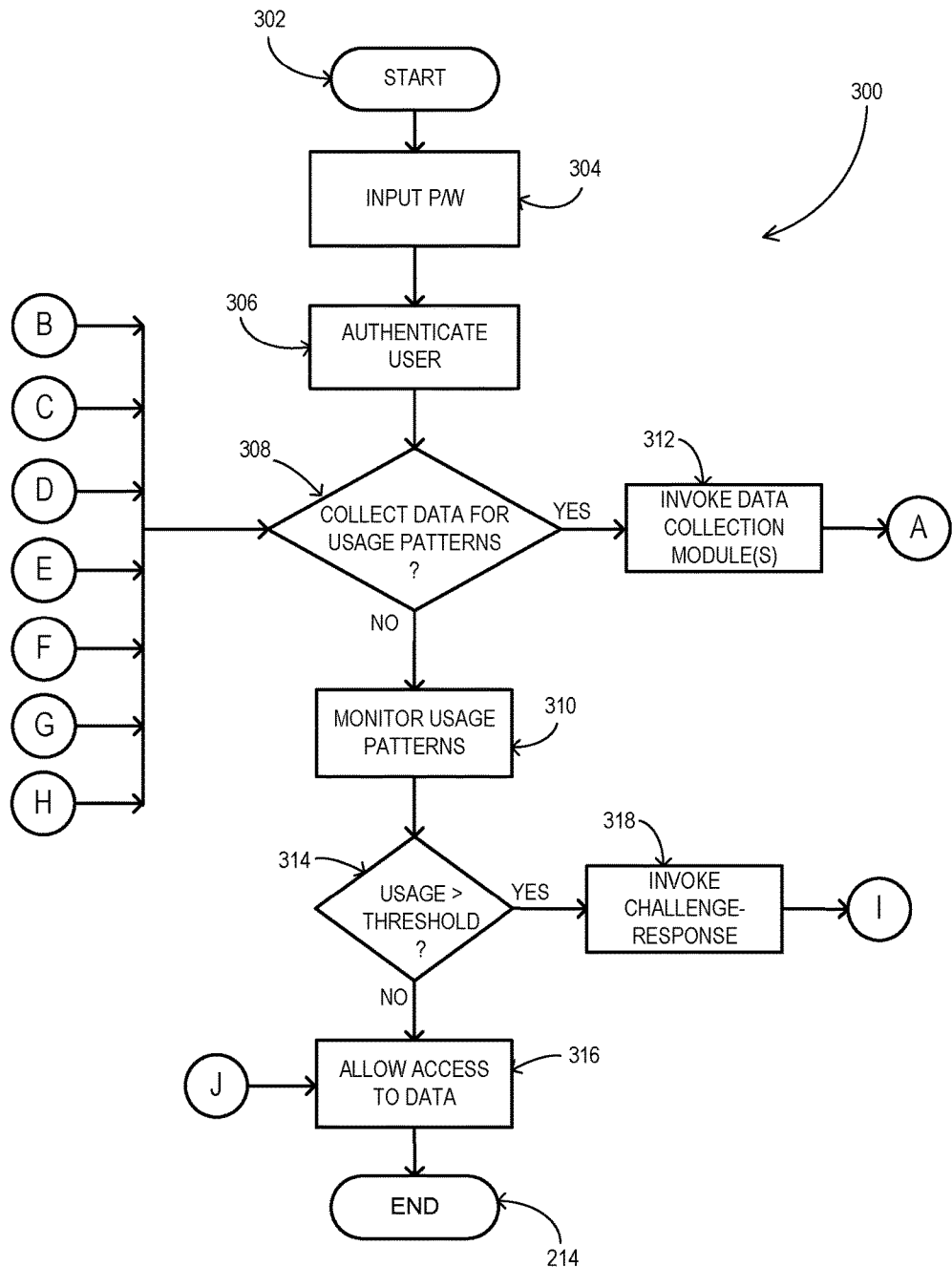
FIG. 4 illustrates a flow diagram showing an embodiment of a method for collecting data representative of usage of a mobile device by one or more authentic users.

Referring to FIGS. 1-2, and FIG. 4, the system 100 includes an exemplary embodiment of a method for collecting data representative of usage of a mobile device by one or more authentic users, shown generally at 300. As an option, the method 300 may be carried out in the context of the architecture and environment of the Figures. However, the method 300 may be carried out in any desired environment.

The method 300 commences in operation 302. In operation 304, a user can input their authentication information, such as a password they created and/or other information that can authenticate the user to the mobile device 116, 118, 120. In operation 306, the user is authenticated. In operation 308, it is determined if usage pattern data, that is representative of one or more usage patterns by an authentic user, needs to be collected. If usage pattern data does not need to be collected, the method 300 continues to operation 310, and if usage pattern data needs to be collected, the method 300 continues to operation 312. In operation 312, one or more data collection modules is invoked, by the method 300, to generate one or more usage patterns of the mobile device 116, 118, 120 by an authentic user.

Figure 5:
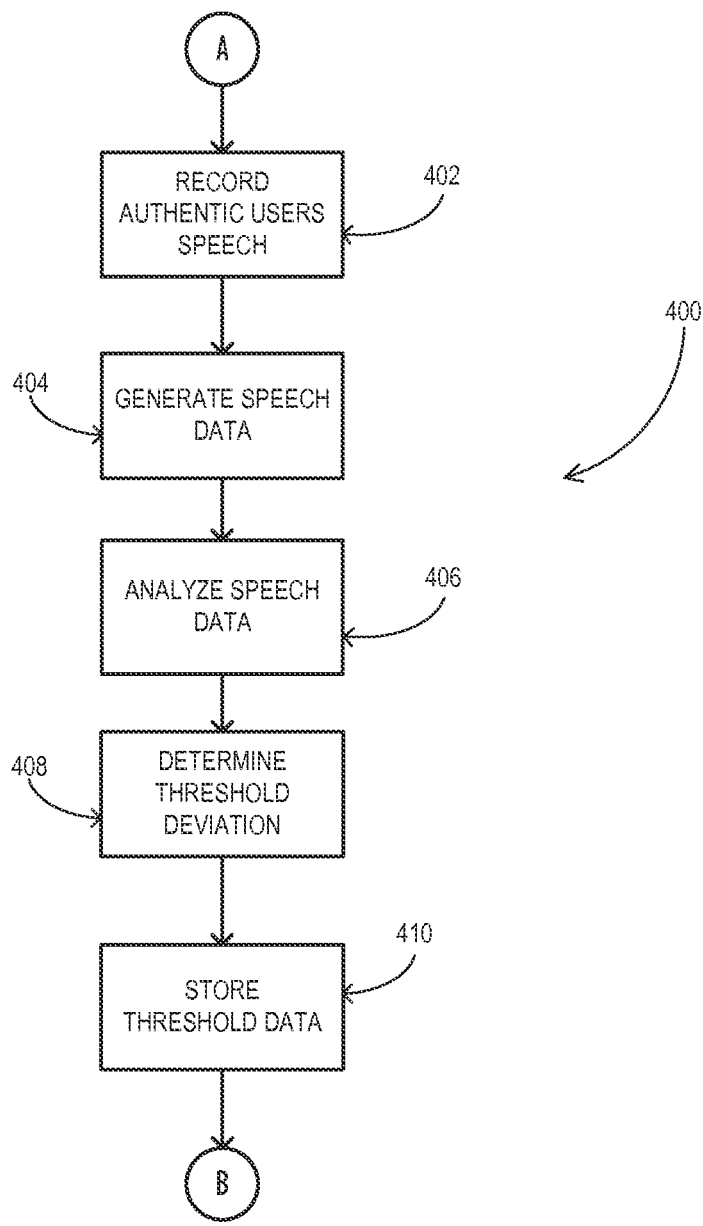
FIG. 5 illustrates a flow diagram showing an embodiment of a method for collecting and generating speech pattern data representative of speech of one or more authentic users.

Referring to FIGS. 1-2, and FIG. 5, the system 100 includes one such data collection module that comprises a method for collecting and generating speech pattern data representative of speech of an authentic user, shown generally at 400. As an option, the method 400 may be carried out in the context of the architecture and environment of the Figures. However, the method 400 may be carried out in any desired environment.

The method 400 commences in operation 402, where the speech of an authentic user is recorded to generate speech pattern data representative of speech of the authentic user. Exemplary speech attributes including pitch, modulation, depth, tonality, frequency, phrase commonalties, as well as many other attributes may be used to generate the speech pattern data. In operation 404, speech pattern data is generated from the user's recorded speech. In operation 406, the speech pattern data is analyzed to determine one or more potential deviations from the speech pattern data. In operation 408, a deviation threshold is determined and, in operation 410, the deviation threshold is stored.

Deviations in a user's speech beyond the deviation threshold can indicate that a user of the mobile device 116, 118, 120 is not an authentic user. Data stored on the mobile device may then be encrypted to prevent access to the data, if speech data from the user deviates from the speech pattern data beyond the threshold, discussed thoroughly hereinafter. The method 400 then returns to the usage data collection method 300, illustrated in FIG. 4.

Figure 6:
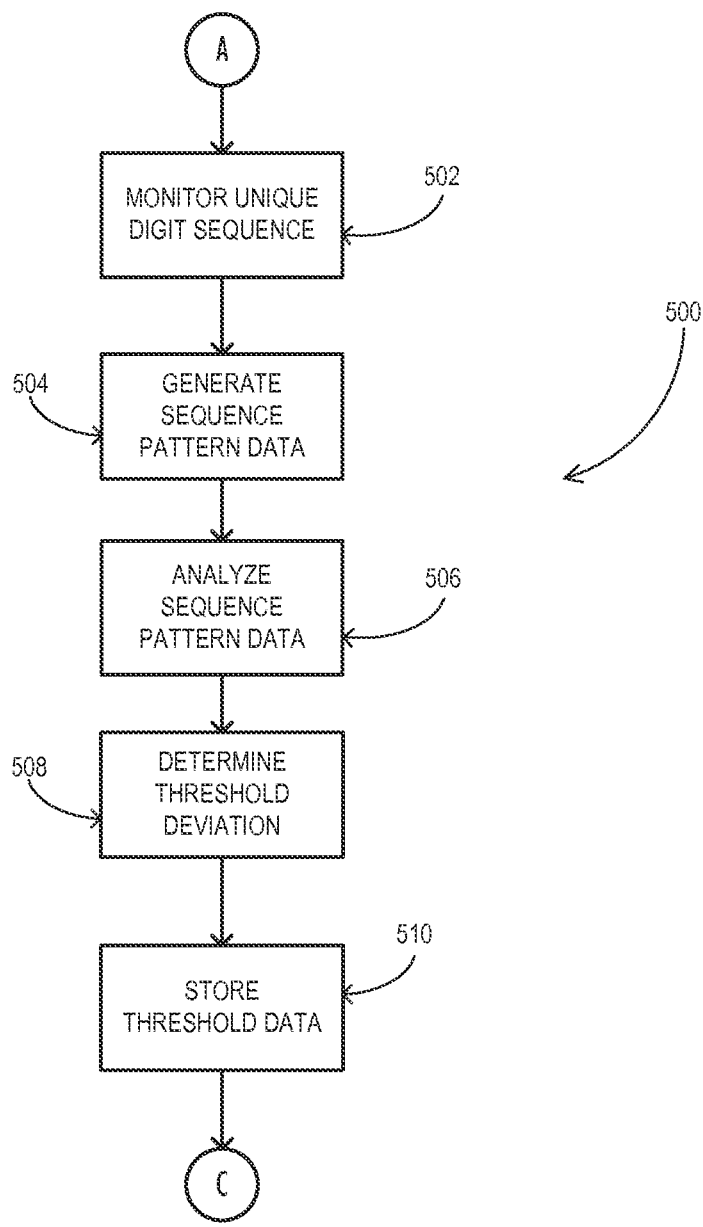
FIG. 6 illustrates a flow diagram showing an embodiment of a method for collecting and generating digit sequence pattern data of one or more authentic users.

Referring to FIGS. 1-2, and FIG. 6, an option, the system 100 can include a data collection module that comprises a method, shown generally at 500, for collecting and generating digit sequence pattern data representative of telephone numbers and other numbers assigned to mobile devices, and other devices, that are contacted, or received, by the authentic user. As an option, the method 500 may be carried out in the context of the architecture and environment of the Figures. However, the method 500 may be carried out in any desired environment.

The method 500 commences in operation 502, where unique sequences of digits input in the mobile device 116, 118, 120 by the authentic user are collected to generate digit sequence data, representative of unique sequences of digits input by the authentic user. These unique sequences of digits can include, but are not limited to, telephone numbers and other numbers assigned to mobile devices, and other devices, that the authentic user may call or message, such as via SMS (Short Message Service) messaging, or may contact via other means, such as Voice Over Internet Protocol (VOIP) and other similar means. Additionally, in operation 502, unique sequences of digits assigned to the mobile devices, or other devices, contacting the authentic user and received by the mobile device 116, 118, 120 can be monitored and collected to generate digit sequence pattern data.

In operation 504, digit sequence pattern data is generated from the collected digit sequence data. In operation 506, the sequence pattern data is analyzed to determine one or more potential deviations from the digit sequence pattern data. In operation 508, a deviation threshold is determined and, in operation 510, the deviation threshold is stored. Deviations in digit sequence pattern beyond the deviation threshold can indicate that a user of the mobile device 116, 118, 120 is not an authentic user. Data stored on the mobile device 116, 118, 120 may then be encrypted to prevent access to the data, as discussed previously. The method 500 then returns to the usage data collection method 300, illustrated in FIG. 4.

Figure 7:
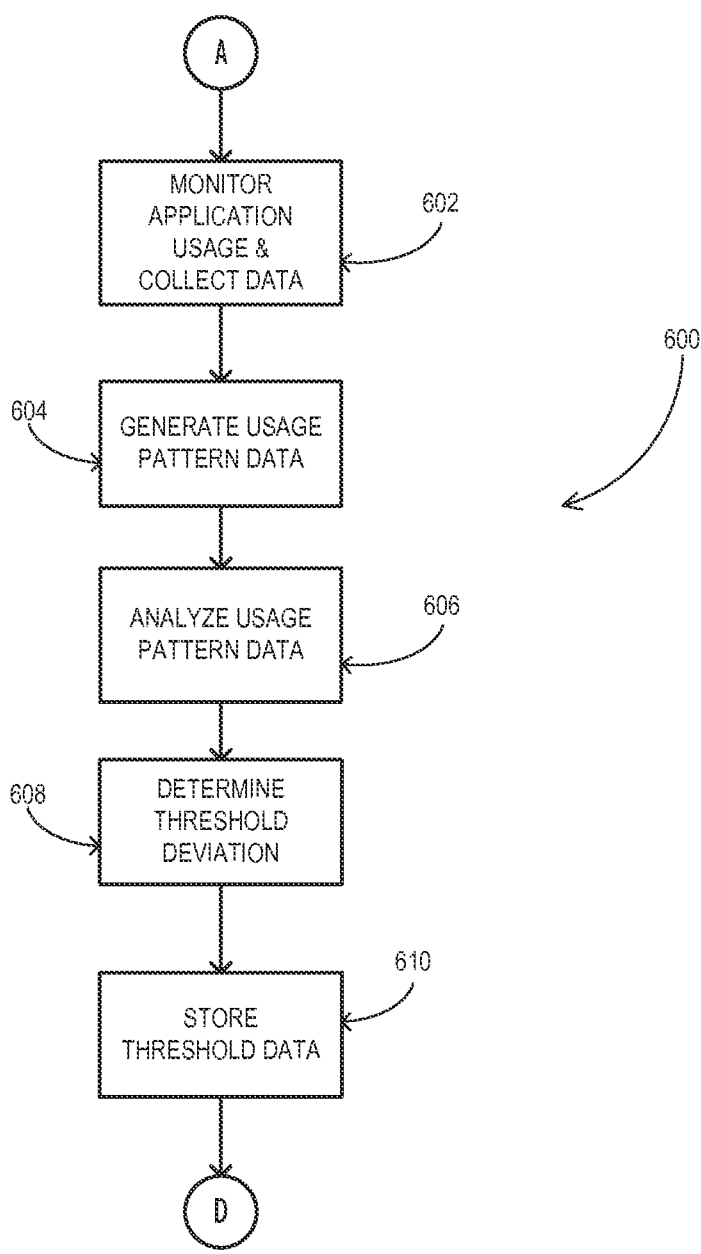
FIG. 7 illustrates a flow diagram showing an embodiment of a method for collecting and generating mobile app usage pattern data by one or more authentic users.

Referring to FIGS. 1-2, and FIG. 7, an option, the system 100 can include a data collection module that comprises a method, shown generally at 600, for collecting and generating data representative of usage of one or more mobile apps by the authentic user. As an option, the method 600 may be carried out in the context of the architecture and environment of the Figures. However, the method 600 may be carried out in any desired environment.

The method 600 commences in operation 602, where usage of one or more mobile apps that may be stored on the mobile device 116, 118, 120 and accessed by the authentic user is monitored. Monitored usage can include, but is not limited to, how often certain apps are accessed, time duration that an app is open (in use), data that may be accessed by an app, as well as numerous other usage attributes that may be representative of mobile apps usage by the authentic user. In operation 604, application usage pattern data is generated from the collected application usage data. In operation 606, the application usage pattern data is analyzed to determine one or more potential deviations from the application usage pattern data. In operation 608, a deviation threshold is determined and, in operation 610, the deviation threshold is stored.

Deviations in application usage pattern beyond the deviation threshold can indicate that a user of the mobile device 116, 118, 120 is not an authentic user. Data stored on the mobile device 116, 118, 120 may then be encrypted to prevent access to the data, as discussed previously. The method 600 then returns to the usage data collection method 300, illustrated in FIG. 4.

Figure 8:
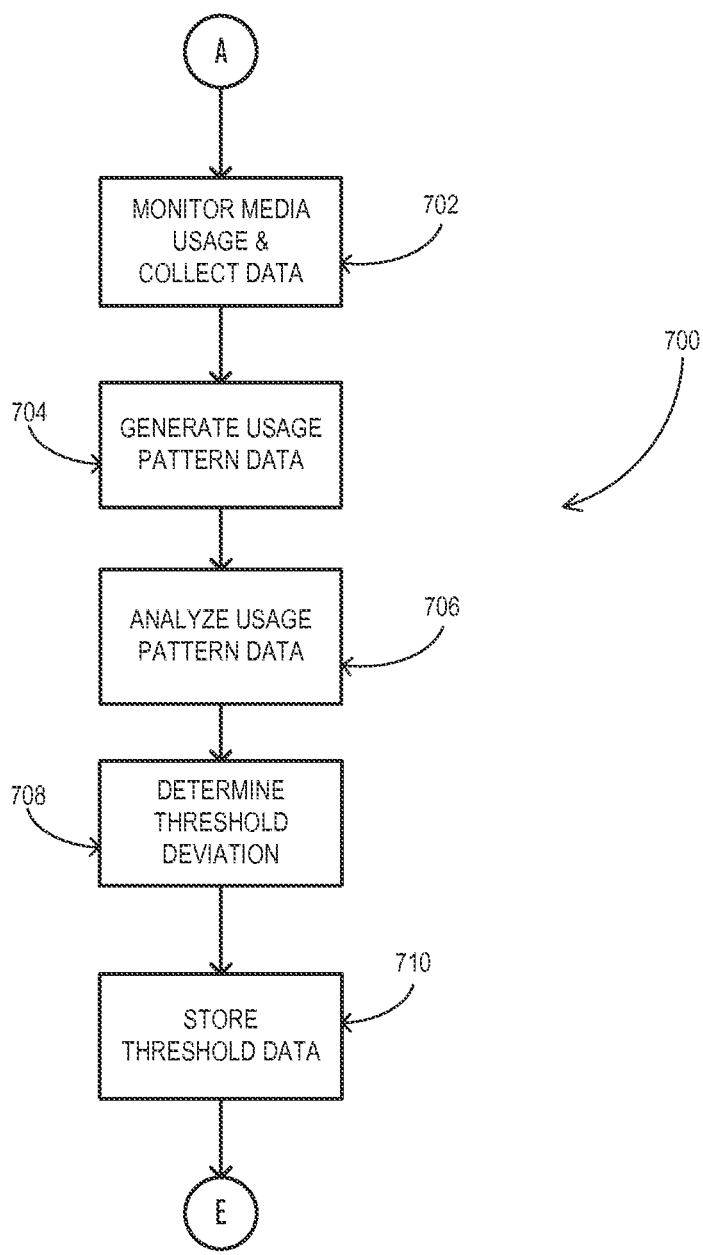
FIG. 8 illustrates a flow diagram showing an embodiment of a method for collecting and generating media usage pattern data by one or more authentic users.

Referring to FIGS. 1-2, and FIG. 8, an option, the system 100 can include a data collection module that comprises a method, shown generally at 700, for collecting and generating data representative of media usage by the authentic user. As an option, the method 700 may be carried out in the context of the architecture and environment of the Figures. However, the method 700 may be carried out in any desired environment.

The method 700 commences in operation 702, where usage of media that may be stored on the mobile device 116, 118, 120 and accessed by the authentic user is monitored. Monitored media usage can include, but is not limited to, how often certain media types, such as music or video, are accessed by the authentic user. Additionally, how often certain music genres, artists, tracks, as well as numerous other media usage attributes that may be representative of media usage by the authentic user may be monitored. In operation 704, media usage pattern data is generated from the collected media usage data. In operation 706, the media usage pattern data is analyzed to determine one or more potential deviations from the media usage pattern data. In operation 708, a deviation threshold is determined and, in operation 710, the deviation threshold is stored. Deviations in media usage pattern beyond the deviation threshold can indicate that a user of the mobile device 116, 118, 120 is not the authentic user. Data stored on the mobile device 116, 118, 120 may then be encrypted to prevent access to the data, as discussed previously. The method 700 then returns to the usage data collection method 300, illustrated in FIG. 4.

Figure 9:
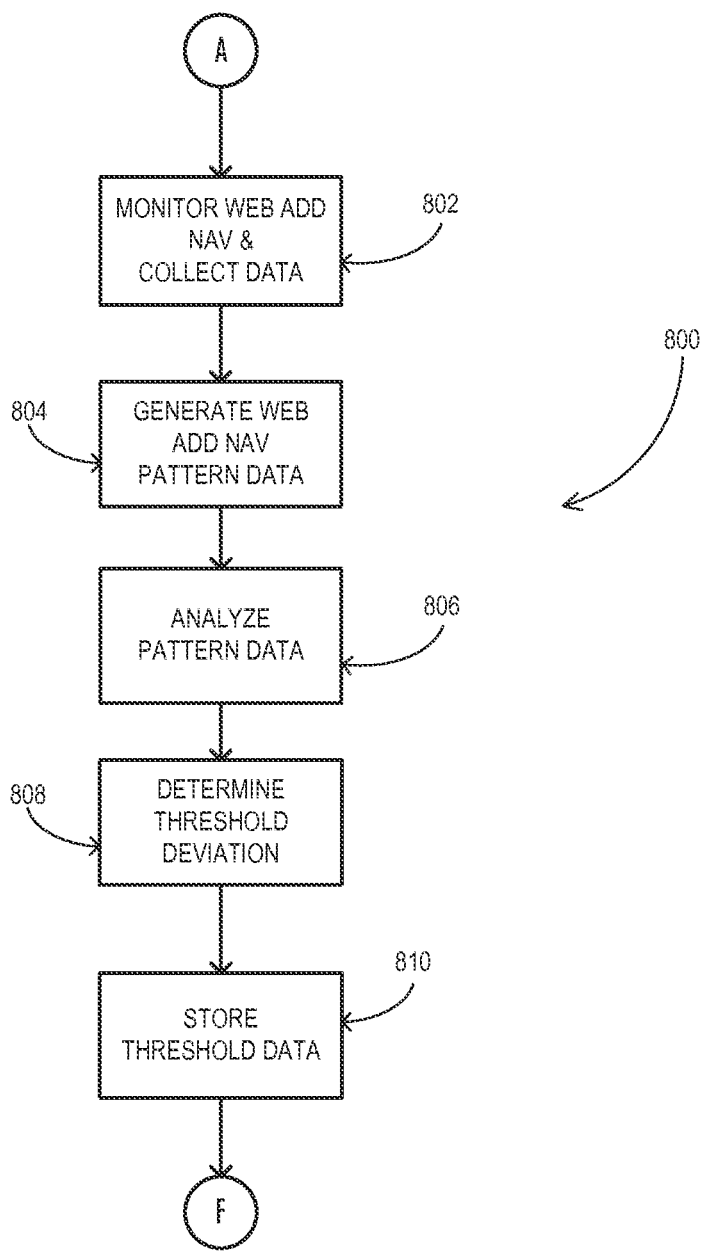
FIG. 9 illustrates a flow diagram showing an embodiment of a method for collecting and generating data web addresses navigation pattern data of one or more authentic users.

Referring to FIGS. 1-2, and FIG. 9, an option, the system 100 can include a data collection module that comprises a method, shown generally at 800, for collecting and generating data representative of instances the authentic user navigated to one or more web addresses. As an option, the method 800 may be carried out in the context of the architecture and environment of the Figures. However, the method 800 may be carried out in any desired environment.

The method 800 commences in operation 802, where instances the authentic user navigated to one or more web addresses using the mobile device 116, 118, 120 are monitored to collect data to generate web addresses navigation pattern data. Monitored web addresses navigation can include, but is not limited to, how frequently certain web addresses are accessed by the authentic user, types of web addresses accessed by the authentic user, and searches performed by the authentic user. In operation 804, web addresses navigation pattern data is generated from the collected data. In operation 806, the web addresses navigation pattern data is analyzed to determine one or more potential deviations from the web addresses navigation pattern data. In operation 808, determined and, in operation 810, the deviation threshold is stored. Deviations in web addresses navigation pattern beyond the deviation threshold can indicate that a user of the mobile device 116, 118, 120 is not the authentic user. Data stored on the mobile device 116, 118, 120 may then be encrypted to prevent access to the data, as discussed previously. The method 800 then returns to the usage data collection method 300.

Figure 10:
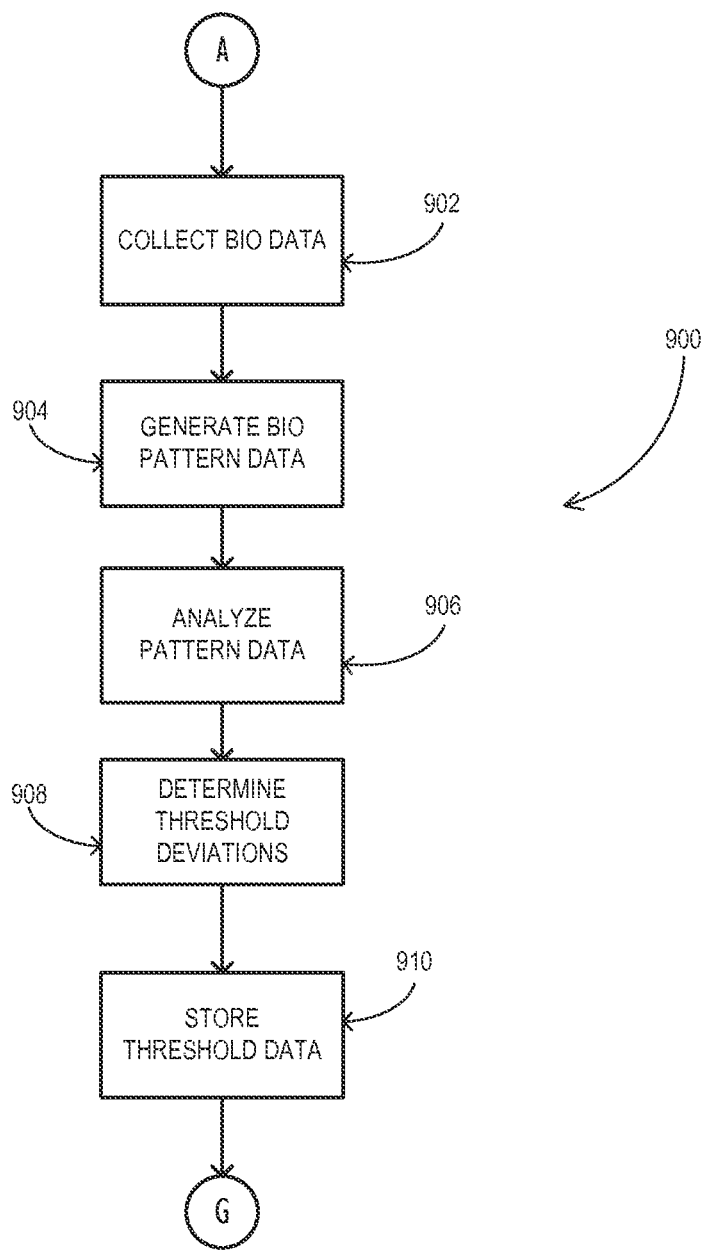
FIG. 10 illustrates a flow diagram showing an embodiment of a method for collecting and generating biometric pattern data of one or more authentic users.

Referring to FIGS. 1-2, and FIG. 10, an option, the system 100 can include a data collection module that comprises a method, shown generally at 900, for collecting biometric information and biometric data of the authentic user. As an option, the method 900 may be carried out in the context of the architecture and environment of the Figures. However, the method 900 may be carried out in any desired environment.

The method 900 commences in operation 902, wherein biometric information is collected from the authentic user to generate biometric data. The biometric data may be generated by the biometric scanner 146, touchscreen 130, camera 132, or combinations thereof, of the smartphone 116 and other mobile devices 118, 120. In the embodiments, the biometric information can comprise fingerprint scans, iris recognition, and other biometric information of the authentic user. Additional biometric information can include, but is not limited to, sensing the authentic user's touch, including speed with which the authentic user types, if the user actuates the keyboard 138 with both hands, speed with which they move their fingers across the touchscreen 130, and other touch sensitive information.

In operation 904, one or more types of biometric pattern data is generated from the collected data. For example, biometric pattern data may be representative of data input via the movements of the fingers of the authentic user across the touchscreen 130, as discussed above. Additionally, biometric pattern data may be representative of one or more fingerprint scans or iris recognition of the authentic user. In operation 906, the biometric pattern data is analyzed to determine one or more potential deviations from the biometric pattern data. In operation 908, one or more deviation thresholds, depending on type of biometric pattern data, is determined, and stored, in operation 910. Deviations in biometric pattern beyond the deviation threshold can indicate that a user of the mobile device 116, 118, 120 is not the authentic user. Data stored on the mobile device 116, 118, 120 may then be encrypted to prevent access to the data, as discussed previously. The method 900 then returns to the usage data collection method 300.

Figure 11:
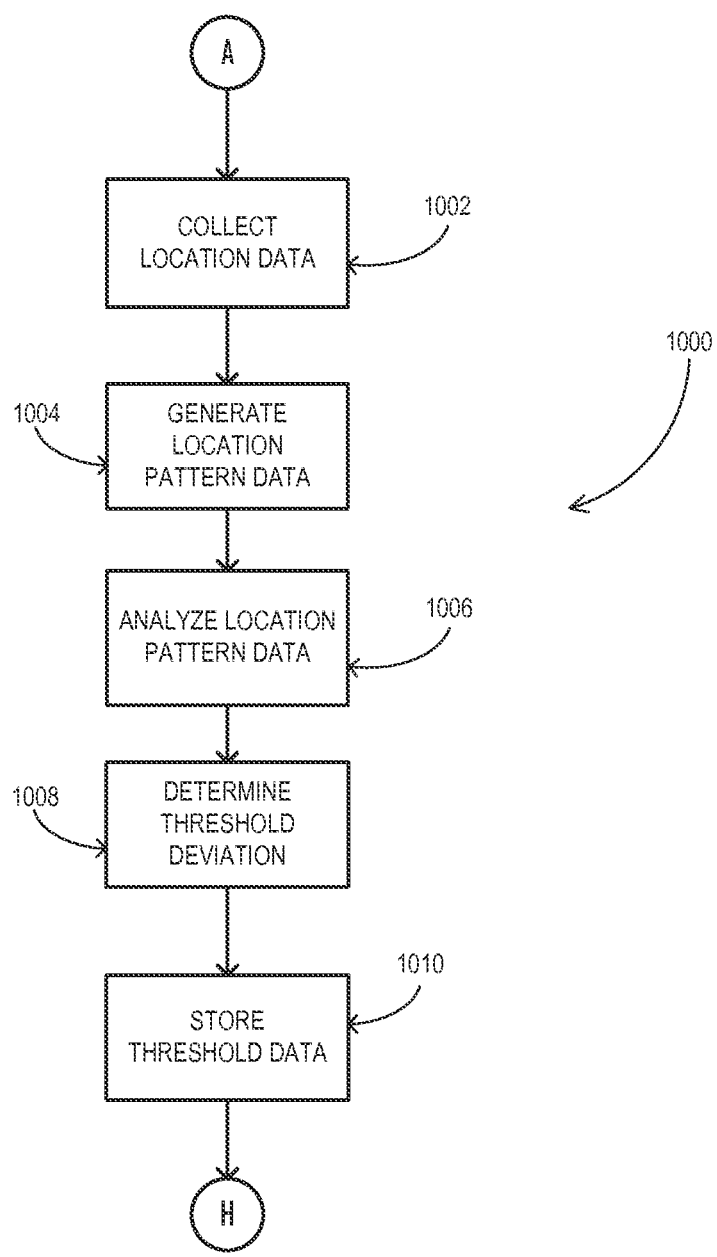
FIG. 11 illustrates a flow diagram showing an embodiment of a method for collecting and generating location pattern data representative of one or more authentic users.

Referring to FIGS. 1-2, and FIG. 11, an option, the system 100 can include a data collection module that comprises a method, shown generally at 1000, for collecting location and movement information to generate location data representative of the authentic user. As an option, the method 1000 may be carried out in the context of the architecture and environment of the Figures. However, the method 1000 may be carried out in any desired environment.

The method 1000 commences in operation 1002, wherein location data is collected to generate location pattern data. The location data may be generated by the geolocation circuitry 140, including the magnetometer circuitry 142 and accelerometer circuitry 144. The magnetometer circuitry 142 measures changes in magnetic field strength surrounding the smartphone 116, or other mobile device 118, 120, the magnetometer circuitry 142 and accelerometer circuitry 144 provide location data that can indicate both movement and location of the smartphone 116, or other mobile device 118, 120.

The geolocation circuitry 140 is able to provide location data that can include tracking movements, even substantially insignificant movements of the mobile device 116, 118, 120. For example, location data collected for generating location pattern data can include, but is not limited to, an average speed with which the authentic user walks and/or runs, an average numbers of steps walked by the authentic user per day, one or more routes the authentic user may travel on a daily or weekly basis, routes and details thereof that the authentic user may travel between common end points, such as the authentic user's home location and a local store they may frequent, the speed and/or angle with which the authentic user may move the mobile device 116, 118, 120 from one common position, such as the authentic user's pocket, to another position, such as to their field of view or ear, among many other potential sources of location data.

In operation 1004, one or more types of location pattern data is generated from the collected location data. In operation 1006, the location pattern data is analyzed to determine one or more potential deviations from the location pattern data. In operation 1008, one or more deviation thresholds, depending on type of location pattern data, is determined, and stored, in operation 1010. Deviations in web addresses navigation pattern beyond the deviation threshold can indicate that a user of the mobile device 116, 118, 120 is not the authentic user. Data stored on the mobile device 116, 118, 120 may then be encrypted to prevent access to the data, as discussed previously. The method 1000 then returns to the usage data collection method 300.

It is to be understood that the various data collection and usage pattern data generation methods 400, 500, 600, 700, 800, 900, 1000 discussed above are exemplary only. The system 100 can include any number of methods for collecting data representative of usage of a mobile device by one or more authentic users and for generating usage pattern data representative of usage of a mobile device by one or more authentic users. The system 100 can system may implement the methods 400, 500, 600, 700, 800, 900, 1000 in software or hardware modules or combinations thereof.

Returning to FIG. 4, the method 300 returns to operation 308, where it is determined if usage pattern data needs to be collected. If usage data does not need to be collected, the method 300 continues to operation 310, and if usage data needs to be collected, the method 300 continues to operation 312. In operation 310, one or more usage patterns are monitored. For example, one to a plurality of usage patterns including speech patterns, digit sequence patterns, location patterns, web addresses navigation patterns, as well other usage patterns discussed above, and additional usage patterns not discussed herein, may be monitored. In some embodiments, all usage patterns can be monitored simultaneously.

In operation 314, it is determined, from the monitored usage pattern data, if at least one usage pattern has deviated beyond its corresponding deviation threshold. If at least one usage pattern has deviated beyond a deviation threshold, it can be an indication that a user of the mobile device 116, 118, 120 is not an authentic user, and access to data stored on the mobile device 116, 118, 120 should be prevented. For example, data stored on the device should be encrypted to prevent access to the data. If no usage patterns have deviated beyond a deviation threshold, the method 300 continues to operation 316, and if at least one usage pattern has deviated beyond a deviation threshold, method 300 continues to operation 318.

Figure 12:
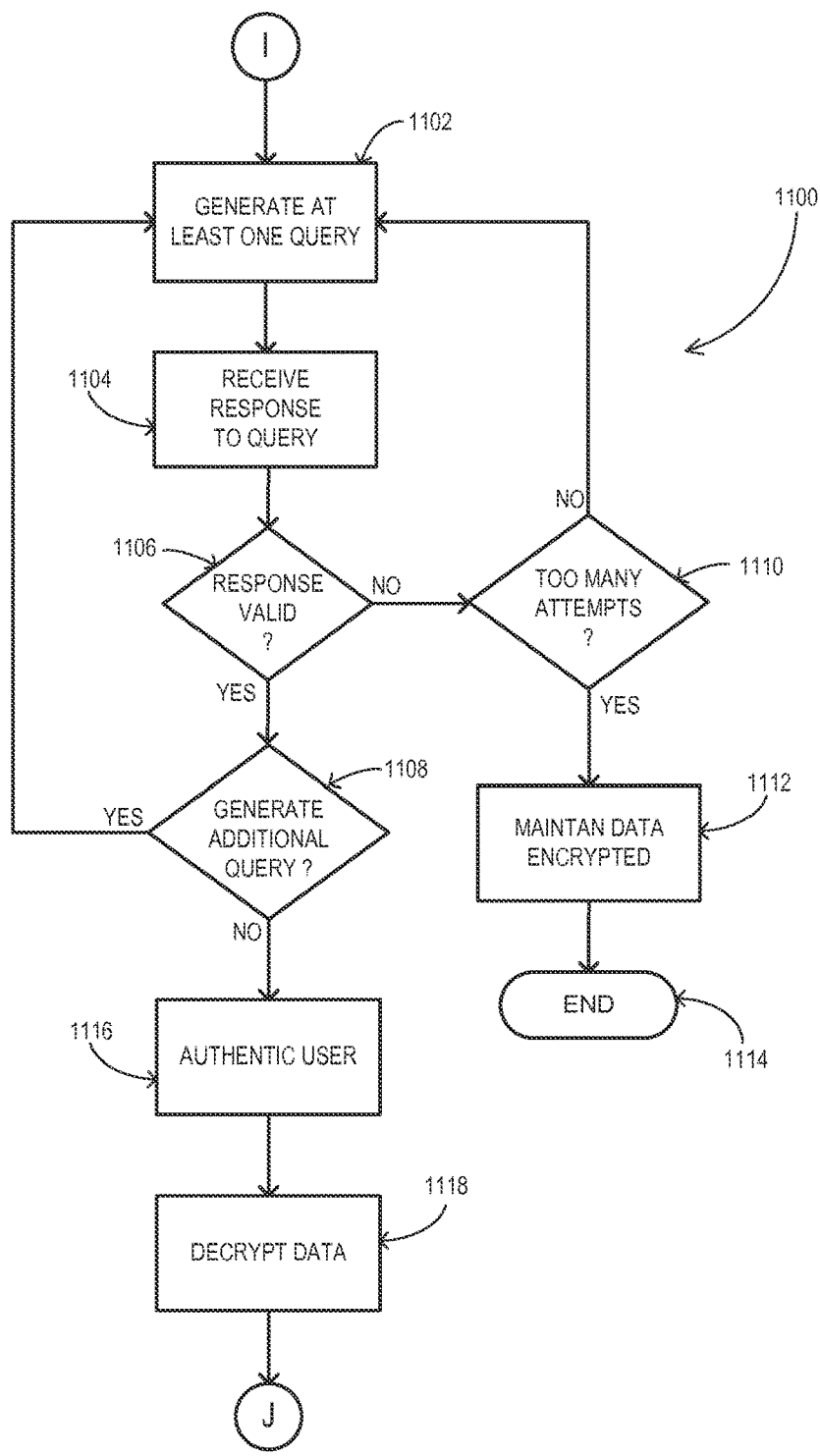
FIG. 12 illustrates a flow diagram showing an embodiment of a method of challenge-response authentication protocol.

As illustrated in FIG. 12, a determination has been made that at least one usage pattern has deviated beyond a deviation threshold. In some embodiments, data stored on the mobile device 116, 118, 120 can then be encrypted to prevent access to the data and access to mobile apps, may be inhibited, or prevented. In other embodiments, access to certain mobile apps and selected data may be prevented or limited. Alternatively, access to all mobile apps and data may be prevented, if is determined that at least one usage pattern has deviated beyond a deviation threshold.

Referring to FIGS. 1-2, and FIG. 12, an option, the system 100 can include a challenge-response authentication protocol module that comprises a method, shown generally at 1100, to determine whether the authentic user or an unauthorized user caused at least one usage pattern to deviate beyond a deviation threshold. As an option, the method 1100 may be carried out in the context of the architecture and environment of the Figures. However, the method 1100 may be carried out in any desired environment.

The method 1100 commences in operation 1102, where at least one query is generated. In some embodiments, one or more queries, and up to a plurality of queries may be generated. A query may comprise any desired query, where a valid response thereto is beneficial in determining whether the user is authentic or unauthorized. For example, a query may comprise requiring the user to input identifying information and authentication information, such as their name and password, as well as other information.

Additional queries may include, but are not limited to, requiring the user to respond to a series of secret questions; requiring the user to speak to compare their speech to the speech pattern data; requiring biometric information of the user to compare their biometric information to the biometric pattern data; requiring web addresses navigation information of the user to compare their web addresses navigation information to the web addresses navigation pattern data. Thus, one or more queries may comprise requiring one or more forms of personal data, such as identifying information and authentication information, from the user and additionally requiring usage information that is represented in one or more usage patterns, of the plurality of usage patterns. In optional embodiments, there may be a time constraint involved wherein the user must respond to the query within a predetermined time period or any response thereto is considered invalid.

In some embodiments, the challenge-response authentication protocol method 1100 may be performed on the mobile device 116, 118, 120. In optional embodiments, the challenge-response authentication protocol method 1100 may be performed on both the mobile device 116, 118, 120 and one or more computing systems 104. For example, it is determined that at least one usage pattern has deviated beyond a deviation threshold, data stored on the device may be encrypted to prevent access to the data, and a notification may be sent to a computing system 104. The computing system 104 may then invoke the challenge-response authentication protocol method 1100, which may be performed either on the mobile device 116, 118, 120 or one or more computing systems 104, or both.

Optionally, upon invoking the challenge-response authentication protocol method 1100, the computing system 104 may transmit one or more queries, discussed above, to the mobile device 116, 118, 120. Using the mobile device 116, 118, 120 the user may respond to the queries. After, or while obtaining one or more responses from the user, the sequence of which may be determined by the queries, the one or more responses from the user are transmitted to the computing system 104 for processing to determine whether the one or more responses received from the user are valid for determining whether the user is authentic or unauthorized.

Referring still to FIG. 12, the method 1100 continues to operation 1104, where a response to each query is received. In operation 1106, it is determined if the response is valid. If the response is valid, the method 1100 continues to operation 1108, and if the response is invalid, the method 1100 continues to operation 1110. In operation 1110, it is determined if an excessive number of invalid responses have been received. If an excessive number of invalid responses have been received, the method 1100 continues to operation 1112, where the data remains encrypted, and access to mobile apps may be inhibited or prevented. If the user is the authentic user, they must use external means, such as contacting a service provider (not discussed herein) to access the encrypted data. The method 1100 then ends in operation 1114.

Returning operation 1108, if a valid response was received in operation 1106, it is determined whether to generate an additional query. If is determined whether to generate an additional query, the method 1100 returns to operation 1102, and if is determined not to generate an additional query, the method 1100 continues to operation 1116. In operation 1116, it is determined that the user is the authentic user and the data is decrypted, in operation 1118. Additionally, access to mobile apps is granted.

Returning to FIG. 4, the method 300 returns to operation 314, where it is determined, from the usage pattern data, that at least one usage pattern has not deviated beyond a deviation threshold. The authorized user can use the mobile device 116, 118, 120 as desired and can access to data stored on the mobile device 116, 118, 120 as well as mobile apps.

Examples

The following examples pertain to further embodiments. Example 1 is a computer readable medium comprising computer executable instructions stored thereon that when executed cause one or more processing units to collect data representative of usage of a mobile computing device by an authentic user; generate one or more usage patterns from the collected data; monitor usage of the mobile computing device; determine whether usage of the mobile computing device deviates from one or more usage patterns beyond at least one threshold of at least one usage pattern; and inhibit access to data stored on the mobile computing device responsive to usage of the mobile computing device exceeding at least one threshold.

Example 2 includes the subject matter of example 1, wherein the instructions that when executed cause one or more processing units to collect data representative of usage comprise instructions that when executed cause the one or more processing units to collect speech data representative of speech of the authentic user; generate speech pattern data from the collected data; compare speech data from a user to the generated speech pattern data for determining whether the user is the authentic user; and inhibit access to data stored on the mobile computing device if the speech data from the user deviates from the speech pattern data beyond the threshold.

Example 3 includes the subject matter of example 2, wherein the instructions that when executed cause one or more processing units to collect data representative of usage further comprise instructions that when executed cause the one or more processing units to monitor unique sequences of digits input by the authentic user; collect digit sequence data representative the unique sequences of digits input by the authentic user; generate digit sequence pattern data from the collected digit sequence data; compare unique sequences of digits input by a user to the digit sequence pattern data; and inhibit access to data stored on the mobile computing device if the unique sequences of digits input by the user deviates from the digit sequence pattern data beyond the threshold.

Example 4 includes the subject matter of example 3, wherein the instructions that when executed cause one or more processing units to collect data representative of usage further comprise instructions that when executed cause the one or more processing units to collect data representative of usage of one or more software applications accessed by the authentic user; generate application usage pattern data from the collected data; compare application usage by a user to the application usage pattern data; and inhibit access to data stored on the mobile computing device if the application usage by the user deviates from the application usage pattern data beyond the threshold.

Example 5 includes the subject matter of example 4, wherein the instructions that when executed cause one or more processing units to collect data representative of usage further comprise instructions that when executed cause the one or more processing units to collect data representative of media usage by the authentic user; generate media usage pattern data from the collected data; compare media usage by a user to the media usage pattern data; and inhibit access to data stored on the mobile computing device if the media usage by the user deviates from the media usage pattern data beyond the threshold.

Example 6 includes the subject matter of example 5, wherein the instructions that when executed cause one or more processing units to collect data representative of usage further comprise instructions that when executed cause the one or more processing units to collect data representative of instances the authentic user navigated to one or more web addresses; generate web addresses navigation pattern data from the collected data; compare web addresses navigation by a user to the web addresses navigation pattern data; and inhibit access to data stored on the mobile computing device if the web addresses navigation by the user deviates from the web addresses navigation pattern data beyond the threshold.

Example 7 is a mobile device that comprises a processor and a memory adapted to store computer executable instructions, the computer executable instructions stored thereon that when executed cause the processor to collect data representative of usage of the mobile computing device by an authentic user; generate one or more usage patterns from the collected data; determine one or more thresholds of the one or more usage patterns; monitor usage of the mobile computing device; determine whether usage of the mobile computing device deviates from one or more usage patterns beyond the one or more thresholds; prevent access to selected data stored on the mobile computing device if deviation from one or more usage patterns is beyond the one or more thresholds; and generate a challenge-response authentication protocol if access to the selected data is prevented.

Example 8 includes the subject matter of example 7, wherein the instructions that when executed cause the processor to collect data representative of usage comprise instructions that when executed cause the one or more processing units to invoke a speaker dependent speech recognition module to collect data representative of speech of the authentic user; generate speech pattern data from the collected data; compare speech data from a user to the generated speech pattern data; and prevent access to the selected data stored on the mobile computing device if the speech data from the user deviates from the speech pattern data beyond a threshold.

Example 9 includes the subject matter of example 8, wherein the instructions that when executed cause one or more processing units to collect data representative of usage further comprise instructions that when executed cause the one or more processing units to monitor unique sequences of digits input by the authentic user; collect digit sequence data representative the unique sequences of digits input by the authentic user; generate digit sequence pattern data from the collected data; compare unique sequences of digits input by a user to the digit sequence pattern data; and prevent access to the selected data stored on the mobile computing device if the unique sequences of digits input by the user deviates from the digit sequence pattern data beyond one or more thresholds.

Example 10 includes the subject matter of example 9, wherein the instructions that when executed cause one or more processing units to collect data representative of usage further comprise instructions that when executed cause the one or more processing units to collect data representative of usage of one or more software applications accessed by the authentic user; generate application usage pattern data from the collected data; compare application usage by a user to the application usage pattern data; and prevent access to the selected data stored on the mobile computing device if the application usage by the user deviates from the application usage pattern data beyond one or more thresholds.

Example 11 includes the subject matter of example 10, wherein the instructions that when executed cause one or more processing units to collect data representative of usage further comprise instructions that when executed cause the one or more processing units to collect data representative of media usage by the authentic user; generate media usage pattern data from the collected data; compare media usage by a user to the media usage pattern data; and prevent access to the selected data stored on the mobile computing device if the media usage by the user deviates from the media usage pattern data beyond one or more thresholds.

Example 12 includes the subject matter of example 11, wherein the instructions to collect data representative of usage further comprise instructions that when executed cause the one or more processing units to collect data representative of instances the authentic user navigated to one or more web addresses; generate web addresses navigation pattern data from the collected data for determining whether navigation to one or more web addresses exceeds a threshold compare web addresses navigation by a user to the web addresses navigation pattern data; and prevent access to the selected data stored on the mobile computing device if the web addresses navigation by the user deviates from the collected web addresses navigation pattern data beyond one or more thresholds.

Example 13 includes the subject matter of example 12, and further comprises magnetometer circuitry for measuring changes in magnetic field strength surrounding the mobile device; accelerometer circuitry for tracking movement of the mobile device, wherein the magnetometer circuitry and accelerometer circuitry generate location data indicating a current location of the mobile device; and wherein the instructions that when executed cause one or more processing units to collect data representative of usage further comprise instructions that when executed cause the one or more processing units to collect the location data generated by movements of the mobile device controlled by the authentic user; generate location pattern data from the collected location data; compare location data generated by a user to the location pattern data; and prevent access to the selected data stored on the mobile computing device if the location data generated by the user deviates from the collected location pattern data beyond one or more thresholds.

Example 14 includes the subject matter of example 13, wherein the instructions that when executed cause one or more processing units to generate a challenge-response authentication protocol further comprise instructions that when executed cause the one or more processing units to generate at least one query, wherein a valid response to the least one query is selected from one or more usage patterns; receive at least one response from a user; and compare the least one response from the user to the valid response to determine if the least one response from the user is the valid response, wherein if the valid response is received from the user, then access to the selected data is granted, and if the valid response is not received from the user, access to the selected data is prevented.

Example 15 includes the subject matter of example 14 and further comprises a touch-sensitive display screen; and wherein the instructions to collect data representative of usage further comprise instructions that when executed cause the one or more processing units to collect user input data generated by movements of a finger of the authentic user across the touch-sensitive display screen of the mobile device; generate user input pattern data from the collected user input data; compare user input data generated by a user to the user input pattern data; and prevent access to the selected data stored on the mobile computing device if the user input data generated by the user deviates from the generated user input pattern data beyond one or more thresholds.

Example 16 includes the subject matter of example 15, and further comprises biometric information circuitry to receive and process biometric information to generate biometric data; and wherein the instructions that when executed cause one or more processing units to collect data representative of usage further comprise instructions that when executed cause the one or more processing units to collect the biometric data generated by biometric information circuitry of the mobile device controlled by the authentic user; generate biometric pattern data from the generated biometric data; compare biometric data generated by a user to the biometric pattern data; and prevent access to the selected data stored on the mobile computing device if the biometric data generated by the user deviates from the generated biometric pattern data beyond one or more thresholds.

Example 17 includes the subject matter of example 16, wherein the biometric information comprises one or more of a fingerprint scan and an iris recognition.

Example 18 is a system that comprises a processor and a memory adapted to store computer executable instructions, the computer executable instructions stored thereon that when executed cause the processor to process personal data received from an authentic user; collect data representative of usage of a mobile computing device by the authentic user; generate a plurality of usage patterns from the collected data, the usage patterns including speech pattern data and digit sequence pattern data; determine one or more thresholds of the plurality of usage patterns; monitor usage of the mobile computing device; determine whether usage of the mobile computing device deviates from one or more usage patterns beyond the one or more thresholds; inhibit access to selected data stored on the mobile computing device if deviation from one or more usage patterns is beyond the one or more thresholds; and generate a challenge-response authentication protocol if access to the selected data is inhibited.

Example 19 includes the subject matter of example 18, wherein personal data is received from more than one authentic user.

Example 20 includes the subject matter of example 19, wherein the instructions that when executed cause the processor to collect data representative of usage comprise instructions that when executed cause the one or more processing units to invoke a speaker dependent speech recognition module to collect data representative of speech of an authentic user; generate speech pattern data from the collected data; compare speech data from a user to the collected speech pattern data; and inhibit access to the selected data stored on the mobile computing device if the speech data from the user deviates from the speech pattern data beyond one or more thresholds.

Example 21 includes the subject matter of example 20, wherein the instructions that when executed cause one or more processing units to collect data representative of usage comprise instructions that when executed cause the one or more processing units to monitor unique sequences of digits input by the authentic user; collect digit sequence data representative the unique sequences of digits input by the authentic user; generate digit sequence pattern data from the collected data; compare unique sequences of digits input by a user to the digit sequence pattern data; and inhibit access to the selected data stored on the mobile computing device if the unique sequences of digits input by the user deviates from the digit sequence pattern data beyond one or more thresholds.

Example 22 includes the subject matter of example 21, wherein the instructions that when executed cause one or more processing units to generate a challenge-response authentication protocol further comprise instructions that when executed cause the one or more processing units to generate at least one query, wherein a valid response to the least one query is selected from personal data received from the authentic user and one or more usage pattern from the plurality of usage patterns; receive at least one response from a user; and compare the least one response from the user to the valid response to determine if the least one response from the user is the valid response, wherein if the valid response is received from the user, then access to the selected data is granted, and if the valid response is not received from the user, access to the selected data is prevented.

Example 23 includes the subject matter of example 22, wherein at least one of the one or more usage pattern from the plurality of usage patterns comprises speech pattern data.

Example 24 includes the subject matter of example 23 and further comprises magnetometer circuitry for measuring changes in magnetic field strength surrounding the mobile device; accelerometer circuitry for tracking movement of the mobile device, wherein the magnetometer circuitry and accelerometer circuitry generate location data indicating a current location of the mobile device; and wherein the instructions that when executed cause one or more processing units to collect data representative of usage further comprise instructions that when executed cause the one or more processing units to collect the location data generated by movements of the mobile device controlled by the authentic user; generate location pattern data from the collected location data; compare location data generated by a user to the location pattern data; and prevent access to the selected data stored on the mobile computing device if the location data generated by the user deviates from the generated location pattern data beyond one or more thresholds.

Example 25 is a method that comprises collecting data representative of usage of a mobile computing device by an authentic user; generating one or more usage patterns from the collected data; determining one or more thresholds of one or more usage patterns; monitoring usage of the mobile computing device; determining whether usage of the mobile computing device exceeds the one or more thresholds; inhibiting access to selected data stored on the mobile computing device if the threshold of one or more usage patterns is exceeded; and generating a challenge-response authentication protocol if access to the selected data is prevented.

Example 26 includes the subject matter of example 25, and further comprises invoking a speaker dependent speech recognition module to collect data representative of speech of an authentic user; generating speech pattern data from the collected data; comparing speech data from a user to the generated speech pattern data; inhibiting access to the selected data stored on the mobile computing device if the speech data from the user deviates from the speech pattern data beyond one or more thresholds; and granting access to the selected data stored on the mobile computing device if the speech data from the user is within the one or more thresholds of the speech pattern data.

Example 27 includes the subject matter of example 26, and further comprises monitoring unique sequences of digits input by the authentic user; collecting digit sequence data representative the unique sequences of digits input by the authentic user; generating digit sequence pattern data from the collected data; comparing unique sequences of digits input by a user to the digit sequence pattern data; inhibiting access to the selected data stored on the mobile computing device if the unique sequences of digits input by the user deviates from the digit sequence pattern data beyond one or more thresholds; and granting access to the selected data stored on the mobile computing device if the unique sequences of digits input by the user are within the one or more thresholds of the digit sequence pattern data.

Example 28 includes the subject matter of example 27, and further comprises generating at least one query, wherein a valid response to the least one query is selected from personal data received from an authentic user and one or more usage pattern from the usage patterns; receiving at least one response from a user; comparing the least one response from the user to the valid response to determine if the least one response from the user is the valid response; preventing access to the selected data stored on the mobile computing device if the valid response is not received from the user; and granting access to the selected data stored on the mobile computing device if the valid response is received from the user.

Example 29 includes the subject matter of example 28, wherein at least one of the one or more usage patterns comprises speech pattern data.

Example 30 includes the subject matter of example 29, and further comprises measuring changes in magnetic field strength surrounding the mobile device and tracking movement of the mobile device for generating location data indicating a current location of the mobile device; and collecting the location data; generating location pattern data from the collected location data; comparing location data generated by a user to the location pattern data to determine whether the location data generated by the user deviates from the collected location pattern data beyond one or more thresholds whether the user is authentic; preventing access to the selected data stored if the location data generated by the user deviates from the collected location pattern data beyond one or more thresholds; and granting access to the selected data if the location data generated by the user is within the one or more thresholds of the location pattern data.

Example 31 is a system that comprises a computing system including one or more processors and a memory adapted to store computer executable instructions, the computer executable instructions stored thereon that when executed cause the one or more processors to collect data representative of usage of a mobile computing device by an authentic user; generate one or more usage patterns from the collected data; determine one or more thresholds of one or more usage patterns; monitor usage of the mobile computing device; determine whether usage of the mobile computing device deviates from one or more usage patterns beyond the one or more thresholds; inhibit access to selected data stored on the mobile computing device if deviation from one or more usage patterns is beyond the one or more thresholds; generate a challenge-response authentication protocol if access to the selected data is inhibited; transmit the challenge-response authentication protocol to the mobile computing device; receive at least one response from a user; compare the least one response to a valid response to determine if the least one response is the valid response; prevent access to the selected data stored on the mobile computing device if the valid response is not received from the user; and grant access to the selected data stored on the mobile computing device if the valid response is received from the user.

Example 32 includes the subject matter of example 31, wherein the instructions that when executed cause one or more processing units to collect data representative of usage further comprise instructions that when executed cause the one or more processing units to invoke a speaker dependent speech recognition module on a mobile computing device to collect data representative of speech of the authentic user; generate speech pattern data from the collected data; compare speech data from a user to the collected speech pattern data; and prevent access to the selected data stored on the mobile computing device if the speech data from the user deviates from the speech pattern data beyond one or more thresholds.

Example 33 includes the subject matter of example 32, wherein the instructions that when executed cause one or more processing units to collect data representative of usage further comprise instructions that when executed cause the one or more processing units to collect the location data generated by movements of the mobile device controlled by the authentic user; generate location pattern data from the collected location data; compare location data generated by a user to the location pattern data; and prevent access to the selected data stored on the mobile computing device if the location data generated by the user deviates from the collected location pattern data beyond one or more thresholds.

Example 34 is a system that comprises data storage means for collecting data representative of usage of a mobile computing device by an authentic user; computing means for generating one or more usage patterns from the collected data; transmitting means for transmitting one or more usage patterns to a computing system for determining one or more thresholds of the one or more usage patterns and for monitoring the one or more usage patterns; computing means for inhibiting access to selected data stored on the mobile computing device if one or more thresholds of one or more usage patterns is exceeded; and receiving means for receiving a challenge-response authentication protocol if access to selected data is prevented.

Example 35 is an apparatus that comprises data storage means for collecting data representative of usage of a mobile computing device by an authentic user; computing means for generating a plurality of usage patterns from the collected data; computing means for determining one or more thresholds of the plurality of usage patterns; computing means for monitoring usage of the mobile computing device; computing means for determining whether usage of the mobile computing device deviates from one or more usage patterns beyond the one or more thresholds; computing means for preventing access to selected data stored on the mobile computing device if deviation from one or more usage patterns is beyond the one or more thresholds; and generating means for generating a challenge-response authentication protocol if access to the selected data is prevented.

In the foregoing description, for purposes of explanation, numerous specific details are set forth in order to provide a thorough understanding of the disclosed embodiments. It will be apparent, however, to one skilled in the art that the disclosed embodiments may be practiced without these specific details. In other instances, structure and devices are shown in block diagram form in order to avoid obscuring the disclosed embodiments. References to numbers without subscripts or suffixes are understood to reference all instance of subscripts and suffixes corresponding to the referenced number. Moreover, the language used in this disclosure has been principally selected for readability and instructional purposes, and may not have been selected to delineate or circumscribe the inventive subject matter, resort to the claims being necessary to determine such inventive subject matter. Reference in the specification to "one embodiment" or to "an embodiment" means that a particular feature, structure, or characteristic described in connection with the embodiments is included in at least one disclosed embodiment, and multiple references to "one embodiment" or "an embodiment" should not be understood as necessarily all referring to the same embodiment.

It is also to be understood that the above description is intended to be illustrative, and not restrictive. For example, above-described embodiments may be used in combination with each other and illustrative process steps may be performed in an order different than shown. Many other embodiments will be apparent to those of skill in the art upon reviewing the above description. The scope of the invention therefore should be determined with reference to the appended claims, along with the full scope of equivalents to which such claims are entitled. In the appended claims, terms "including" and "in which" are used as plain-English equivalents of the respective terms "comprising" and "wherein."

What is claimed is:

1. A hardware computer readable medium comprising instructions that, when executed, cause a machine to at least:
    collect usage data representative of usage of a mobile computing device by an authentic user;
    collect media data representative of media usage by the authentic user including a frequency of access of music content by genre, by artist, or a combination thereof;
    generate one or more usage patterns from the collected usage data and the media usage, the one or more usage patterns including a pattern of use of a spoken phrase by the authentic user;
    monitor second media usage by a second user;
    monitor second usage of the mobile computing device by the second user, the second usage of the mobile computing device by the second user including a detected pattern of use of the spoken phrase by the second user and the second media usage by the second user;
    in response to determining that the monitored second usage of the mobile computing device by the second user meets a threshold of deviation from the one or more usage patterns of the authentic user, encrypting data stored on the mobile computing device.

2. The hardware computer readable medium of claim 1, wherein the instructions, when executed, cause the machine to:
    monitor unique sequences of digits input by the authentic user, wherein the one or more usage patterns include the unique sequences of digits input by the authentic user; and
    monitor second unique sequences of digits input by the second user, wherein the monitored second usage of the mobile computing device by the second user includes the unique sequences of digits input by the second user.

3. The hardware computer readable medium of claim 1, wherein the instructions, when executed, cause the machine to:
    collect application data representative of usage of one or more software applications accessed by the authentic user, wherein the one or more usage patterns include the usage of the one or more software applications accessed by the authentic user; and monitor second application usage by the second user, wherein the monitored second usage of the mobile computing device by the second user includes the second application usage by the second user.

4. The hardware computer readable medium of claim 1, wherein the instructions, when executed, cause the machine to:
collect web data representative of instances of the authentic user navigating to one or more web addresses, wherein the one or more usage patterns include the instances the authentic user navigated to the one or more web addresses; and
monitor second web addresses accessed by the second user, wherein the monitored second usage of the mobile computing device by the second user includes the second web addresses accessed by the second user.

5. A system comprising:
a processor and a memory adapted to store computer executable instructions, the computer executable instructions, when executed, cause the processor to at least:
collect usage data representative of usage of a mobile computing device by an authentic user;
collect media data representative of media usage by the authentic user including a frequency of access of music content by genre, by artist, or a combination thereof;
generate a plurality of usage patterns from the collected usage data and the media usage, the plurality of usage patterns including a pattern of use of a spoken phrase by the authentic user;
monitor second media usage by a second user;
monitor second usage of the mobile computing device by the second user, the monitored second usage of the mobile computing device including a second detected pattern of use of the spoken phrase by the second user and the second media usage by the second user;
in response to determining that the second monitored usage of the mobile computing device by the second user meets a threshold of deviation from the plurality of the usage patterns of the authentic user, encrypting data stored on the mobile computing device; and
generate a challenge-response authentication protocol.

6. The system of claim 5, wherein the challenge-response authentication protocol is generated based on personal data received from more than one authentic user.

7. The system of claim 5, wherein the instructions, when executed, cause the processor to:
generate at least one query, wherein a valid response to the least one query is selected from one or more usage patterns of the plurality of usage patterns;
receive at least one response from the second user;
compare the at least one response from the second user to the valid response to determine whether the at least one response from the second user corresponds to the valid response; and
in response to the at least one response corresponding to the valid response, decrypt the data.

8. A system comprising:
a server including one or more processors and a memory adapted to store computer executable instructions, the computer executable instructions, when executed, to cause the one or more processors to at least:
collect usage data representative of usage of a mobile computing device by an authentic user;
collect media data representative of media usage by the first user including a frequency of access of music content by genre, by artist, or a combination thereof;
generate one or more usage patterns from the collected usage data and the media usage, the one or more usage patterns including a pattern of use of a spoken phrase by the authentic user;
monitor second media usage by a second user;
monitor second usage of the mobile computing device by the second user, the monitored second usage of the mobile computing device by the second user including a detected second pattern of use of the spoken phrase by the second user and the second media usage by the second user;
in response to determining that monitored second usage of the mobile computing device by the second user meets a threshold of deviation from the one or more usage patterns of the authenticated user, encrypt data stored on the mobile computing device;
generate a challenge-response authentication protocol;
transmit the challenge-response authentication protocol to the mobile computing device;
receive at least one response from the mobile computing device; and
determine whether to decrypt the data based on a comparison of the at least one response to a valid response.

* * * * *